US012320626B2

(12) United States Patent
Baker et al.

(10) Patent No.: US 12,320,626 B2
(45) Date of Patent: Jun. 3, 2025

(54) GEL STEMMING DELIVERY SYSTEM

(71) Applicant: PWS—Stemsafe JV Pty Ltd, Mackay (AU)

(72) Inventors: Edward Baker, Perth (AU); Andrew Wheeler, Mackay (AU); Damien Browne, Perth (AU); Allen Park, Salter Point (AU)

(73) Assignee: PWS—Stemsafe JV Pty Ltd, Mackay (AU)

( * ) Notice: Subject to any disclaimer, the term of this patent is extended or adjusted under 35 U.S.C. 154(b) by 447 days.

(21) Appl. No.: 17/755,402

(22) PCT Filed: Nov. 4, 2020

(86) PCT No.: PCT/AU2020/051197

§ 371 (c)(1),
(2) Date: Apr. 28, 2022

(87) PCT Pub. No.: WO2021/087559

PCT Pub. Date: May 14, 2021

(65) Prior Publication Data

US 2022/0381544 A1 Dec. 1, 2022

(30) Foreign Application Priority Data

Nov. 4, 2019 (AU) ................................ 2019904155

(51) Int. Cl.
*F42D 1/28* (2006.01)
*B01F 23/40* (2022.01)
(Continued)

(52) U.S. Cl.
CPC .............. *F42D 1/28* (2013.01); *B01F 23/452* (2022.01); *B01F 23/48* (2022.01); *B01F 25/105* (2022.01);
(Continued)

(58) Field of Classification Search
CPC ..... F42D 1/08; F42D 1/10; F42D 1/12; F42D 1/28; B01F 23/452; B01F 23/565; B01F 35/717
See application file for complete search history.

(56) References Cited

U.S. PATENT DOCUMENTS 3,848,507 A * 11/1974 Wisinski ............... E21B 43/263 366/168.2
3,943,820 A * 3/1976 Persson ..................... F42D 1/10 149/44

(Continued)

FOREIGN PATENT DOCUMENTS

EP 3119736 A1 1/2017
WO 2014/201514 A1 12/2014

OTHER PUBLICATIONS

International Search Report issued in Application No. PCT/UA2020/051197, mailed on Jan. 22, 2021 (5 pages).

(Continued)

*Primary Examiner* — Sunil Singh
(74) *Attorney, Agent, or Firm* — OSHA BERGMAN WATANABE & BURTON LLP

(57) ABSTRACT

A delivery system for mixing and dispensing a gel stemming material into a blast hole is disclosed. The system includes a dual-pump assembly in fluid communication with respective sources of a first gel precursor fluid and a second gel precursor fluid; a pair of hoses associated with a means to vary an effective length of said hoses; a dosing head having a first inlet and a second inlet, said inlets arranged in respective fluid communication via said hoses with the dual pump assembly to receive the first and second gel precursor fluids, the dosing head being configured to receive and mix the first and second gel precursor fluids to produce the gel stemming material and to dispense the gel stemming material via an outlet. In use, the effective length of the hoses may be varied to position the dosing head and dispense the gel stemming material in the blast hole.

11 Claims, 7 Drawing Sheets

(51) Int. Cl.

| | |
|---|---|
| ***B01F 23/45*** | (2022.01) |
| ***B01F 25/00*** | (2022.01) |
| ***B01F 25/314*** | (2022.01) |
| ***B01F 35/71*** | (2022.01) |
| ***F42D 1/12*** | (2006.01) |
| *E21D 9/00* | (2006.01) |
| *F42D 1/10* | (2006.01) |

(52) U.S. Cl.
CPC ........ *B01F 25/3143* (2022.01); *B01F 35/712* (2022.01); *B01F 35/7176* (2022.01); *F42D 1/12* (2013.01); *E21D 9/006* (2013.01); *F42D 1/10* (2013.01)

(56) References Cited

U.S. PATENT DOCUMENTS

| | | | | |
|---|---|---|---|---|
| 4,685,375 | A * | 8/1987 | Ross | C06B 21/0008 86/20.12 |
| 2011/0200389 | A1 * | 8/2011 | Whitley | E01C 23/06 404/101 |
| 2016/0091291 | A1 * | 3/2016 | Halander | F42D 1/10 102/313 |
| 2016/0138899 | A1 * | 5/2016 | Park | F42D 1/28 102/313 |

OTHER PUBLICATIONS

Written Opinion issued in International Application No. PCT/AU2020/051197, mailed on Jan. 22, 2021 (5 pages).

* cited by examiner

GEL STEMMING DELIVERY SYSTEM

TECHNICAL FIELD

The present disclosure relates to a delivery system for mixing and dispensing a gel. In particular, the present disclosure relates to a delivery system configured to mix and dispense a two-part gel stemming material into a blast hole.

BACKGROUND

The following discussion of the background to the disclosure is intended to facilitate an understanding of the embodiments described herein. However, it should be appreciated that the discussion is not an acknowledgement or admission that any of the material referred to was published, known or part of the common general knowledge as at the priority date of the application.

Drilling and blasting is widely used in mining, quarrying and civil engineering. Blast holes are first drilled in a predetermined blast hole pattern and explosives and a detonator are then loaded downhole. The blast hole may subsequently be filled ('stemmed') with aggregate stemming material to increase the effectiveness of the subsequent explosion. Upon detonation, the resulting explosion creates stress waves, causing radial fracturing of surrounding rock mass and generating intense noise and dust.

There are several problems associated with using an aggregate stemming material. Firstly, it is labour intensive to deploy aggregate materials downhole and there are several safety risks to personnel in not only handling the aggregate material (due to its weight) but in being in close proximity to the blast hole loaded with explosives. Moreover, in the event that the detonator fails, the stemming material must be removed from the blast hole before the explosives can be retrieved. Aggregate stemming material is also frequently ejected from the blast hole during the explosion, reducing the efficiency of the blast and contributing to noise and dust emissions.

International Publication No. WO2014/201514 describes the use of an alternative a stemming material for a blast hole comprising a superabsorbent hydrogel, for which there are a number of advantages. Rather than using aggregate materials, a fully reacted superabsorbent hydrogel is pumped into the blast hole above the explosives to form a stem of superabsorbent hydrogel ('gel stem'). The gel stem entirely fills the blasthole, regardless of variations in the size of the blast hole with depth or diameter or the presence of fissures in the blast hole wall. Upon detonation, the gel stem reflects the pressure wave of the explosion thereby increasing the efficiency of the explosives during blasting. The gel stem does not tend to be expelled from the blast hole during the explosion, advantageously reducing noise and suppressing dust. Moreover, in the event that the detonator fails, the explosives can be retrieved by drawing them through the gel stem—there is no need to remove the gel stem beforehand. The superabsorbent hydrogel may be prepared by reacting a polymer precursor with water whereupon the polymer precursor rapidly swells (1-5 sec) to form said gel. Although it is possible to pump the gel from the surface, it would be preferable for the gel to be mixed immediately before being placed downhole. Further, it would also be advantageous to reduce the manual labour associated with stemming a blast hole and to improve the safety of personnel by reducing the amount of time spent in proximity with loaded blast holes.

The present disclosure seeks to at least partially resolve some of these issues.

SUMMARY

The present disclosure provides a delivery system for mixing and dispensing a gel. In particular, the present disclosure provides a delivery system configured to mix and dispense a two-part gel stemming material into a blast hole.

According to a first aspect of the disclosure, there is provided a delivery system for mixing and dispensing a gel stemming material into a blast hole, said system comprising:

- a dual-pump assembly in fluid communication with respective sources of a first gel precursor fluid and a second gel precursor fluid;
- a pair of hoses associated with a means to vary an effective length of said hoses;
- a dosing head having a first inlet and a second inlet, said inlets arranged in respective fluid communication via said hoses with the dual pump assembly to receive the first and second gel precursor fluids, the dosing head being configured to receive and mix the first and second gel precursor fluids to produce the gel stemming material and to dispense the gel stemming material via an outlet;
- whereby, in use, the effective length of the hoses may be varied to position the dosing head and dispense the gel stemming material in the blast hole.

In one embodiment, the dosing head comprises a first chamber comprising a central passage and a concentrically aligned annular passage in fluid communication with the first and second inlets, respectively, and a second chamber in fluid communication with said central and annular passages, the second chamber being configured to receive and mix the first and second gel precursor fluids to produce the gel stemming material and to dispense the gel stemming material via the outlet.

In one embodiment, the second chamber further comprises a static mixing element.

In one embodiment, the dual-pump assembly comprises a control system to vary any one or more of pressure, volume, flow rate of the first and/or second gel precursor fluids flowing through the hoses. The control system may be provided with one or more in-line flow meters to monitor one or more of pressure, volume, flow rate of the first and/or second gel precursor fluids in the hoses.

In one embodiment, the means for varying the effective length of the pair of hoses may comprise a hose reel. The hose reel may be remotely controlled to vary the effective length of the pair of hoses.

In one embodiment, the delivery system further comprises at least one storage container for holding the first gel precursor fluid or the second gel precursor fluid. The at least one storage container may be provided with an agitator.

In one embodiment, the delivery system may be mounted on a platform or frame adapted to enable mobility of the delivery system. For example, the platform or frame may be configured with lifting lugs and/or lifting slots. In this way, the delivery system may be readily transported to one or more locations on a worksite.

Alternatively, the platform or frame having the delivery system mounted thereon may be mounted on a vehicle.

In one embodiment, the delivery system further comprises an arm movable between a stowed position and an extended position, the arm having a collar at a distal end thereof adapted to support the hoses and the dosing head to facilitate positioning of the dosing head downhole.

In one embodiment, the arm may be rotationally mounted to allow the arm to slew when in the extended position.

According to a second aspect of the disclosure, there is provided a method of stemming a blast hole, the method comprising:

- positioning a delivery system as defined above proximal to a blast hole;
- varying an effective length of the hoses of the delivery system to deploy the dosing head of the delivery system downhole of the blast hole;
- operating the dual pump assembly of the delivery system to draw the first and second gel precursor fluids from their respective sources and cause said fluids to flow through the hoses to the dosing head, whereupon said fluids are received and mixed in the dosing head to produce the gel stemming material; and
- dispensing the gel stemming material via the outlet the dosing head.

In one embodiment, concomitantly with, or subsequent to, dispensing the gel stemming material, the method further comprises shortening the effective length of the hoses to progressively withdraw the dosing head from the blast hole as the blast hole is stemmed with the gel stemming material.

BRIEF DESCRIPTION OF DRAWINGS

Embodiments of the disclosures will now be described by way of example with reference to the accompany figures in which.

DESCRIPTION OF EMBODIMENTS

General Terms

Figure 1:
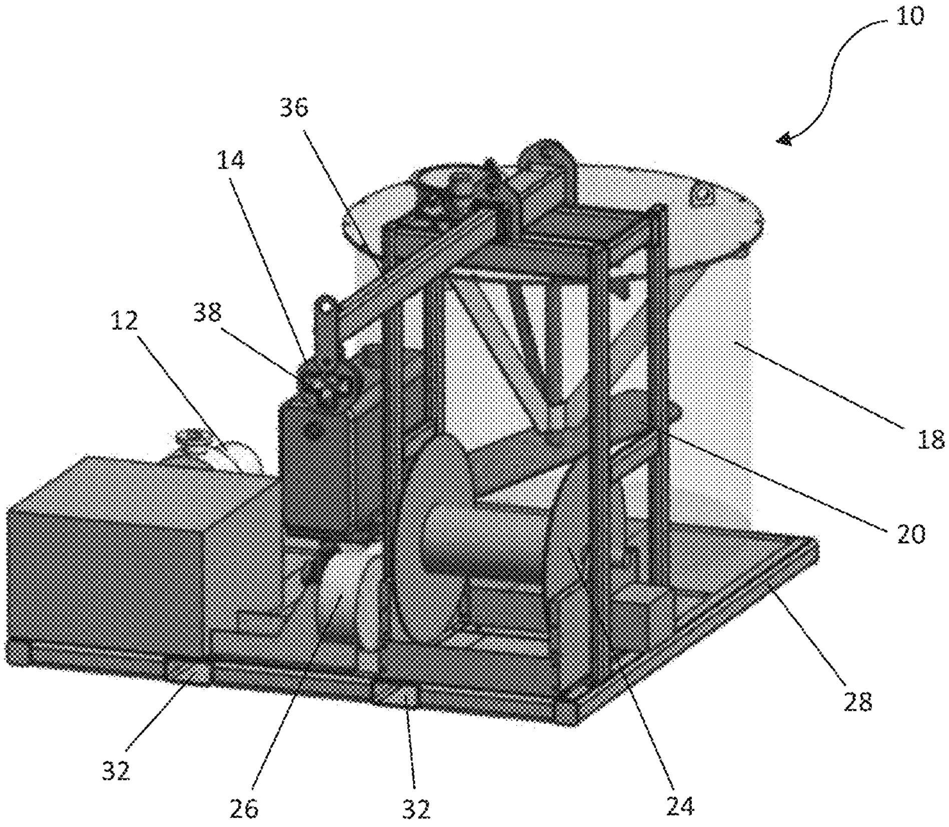
FIG. 1 is a perspective view of one embodiment of a delivery system disclosed herein.

Throughout this specification, unless specifically stated otherwise or the context requires otherwise, reference to a single step, composition of matter, group of steps or group of compositions of matter shall be taken to encompass one and a plurality (i.e. one or more of those steps, compositions of matter, groups of steps or groups of compositions of matter). Thus, as used herein, the singular forms “a”, “an” and “the” include plural aspects unless the context clearly dictates otherwise. For example, reference to “a” includes a single as well as two or more; reference to “an” includes a single as well as two or more; reference to “the” includes a single as well as two or more and so forth.

Each example of the present disclosure described herein is to be applied mutatis mutandis to each and every other example unless specifically stated otherwise. The present disclosure is not to be limited in scope by the specific examples described herein, which are intended for the purpose of exemplification only. Functionally-equivalent products, compositions and methods are clearly within the scope of the disclosure as described herein.

The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being “on”, “engaged to”, “connected to” or “coupled to” another element or layer, it may be directly on, engaged, connected or coupled to the other element or layer, or intervening elements or layers may be present. In contrast, when an element is referred to as being “directly on,” “directly engaged to”, “directly connected to” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.).

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

Reference to positional descriptions, such as lower and upper, are to be taken in context of the embodiments depicted in the figures, and are not to be taken as limiting the invention to the literal interpretation of the term but rather as would be understood by the skilled addressee.

Spatially relative terms, such as “inner,” “outer,” “beneath”, “below”, “lower”, “above”, “upper” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

The term “and/or”, e.g., “X and/or Y” shall be understood to mean either “X and Y” or “X or Y” and shall be taken to provide explicit support for both meanings or for either meaning.

Throughout this specification the word “comprise”, or variations such as “comprises” or “comprising”, will be understood to imply the inclusion of a stated element, integer or step, or group of elements, integers or steps, but not the exclusion of any other element, integer or step, or group of elements, integers or steps.

Unless otherwise defined, all technical and scientific terms used herein have the same meaning as commonly understood by one of ordinary skill in the art to which the contents of the present disclosure belongs. Although methods and materials similar or equivalent to those described herein can be used in the practice or testing of the present disclosure, suitable methods and materials are described below. In case of conflict, the present specification, including definitions, will control. In addition, the materials, and examples are illustrative only and do not intend to be limiting.

The term "about" as used herein means within 5%, and more preferably within 1%, of a given value or range. For example, "about 3.7%" means from 3.5 to 3.9%, preferably from 3.66 to 3.74%. When the term "about" is associated with a range of values, e.g., "about X % to Y %", the term "about" is intended to modify both the lower (X) and upper (Y) values of the recited range. For example, "about 20% to 40%" is equivalent to "about 20% to about 40%".

Specific Terms

The term 'blast hole' as used herein refers to a drilled hole of a pre-determined depth and diameter containing explosives. Generally a plurality of blast holes, such as a row or an array of blast holes, may be drilled in an open pit or underground operation according to a drill pattern for a blasting site based on parameters such as rock burden including rock type and density, spacing between blast holes, blast hole depth and diameter for a predetermined explosive, and where required, blast hole orientation and angles. The drill pattern may be designed by a drilling and blasting engineer in accordance with well-established models and protocols appropriate for the desired shaped blast.

The term 'stem' as used herein refers to a pre-determined mass and volume of a stemming material capable, when placed downhole, of at least partially dampening and/or containing the gases and forces released by detonation of explosives in a blast hole. The pre-determined mass and volume of the stemming material may be calculated by conventional techniques well understood by those skilled in the art and is dependent on the depth and diameter of the blast hole, blast hole orientation and angle of orientation from vertical, and the amount and nature of the explosives loaded into the blast hole.

The term 'gel' refers to a semi-solid substance comprising a non-fluid colloidal network or a polymer network that is expanded throughout its whole volume by a fluid. The gel may consist of two or more components, one of which is a liquid, present in substantial quantity.

The term 'hydrogel' as used herein refers to a gel resulting from a network of crosslinked hydrophilic polymer chains in which water is the dispersion medium.

The term 'superabsorbent polymer' as used herein refers to a polymeric material that is capable of absorbing at least 25 times its own weight in aqueous fluid and is capable of retaining the absorbed aqueous fluid under moderate pressure. The absorbed aqueous fluid is taken into the molecular structure of the superabsorbent polymer rather than being contained in pores from which the fluid could be eliminated by squeezing. Some superabsorbent polymers can absorb up to 1000 times their weight in aqueous fluid.

Delivery System

The present disclosure relates to a delivery system for mixing and dispensing a gel. In particular, the present disclosure relates to a delivery system configured to mix and dispense a two-part gel stemming material into a blast hole.

The two-part gel stemming material may be a hydrogel, in particular a super absorbent polymer (SAP) gel. Suitable examples of SAPs include, but are not limited to, polyacrylic acid and polyacrylic acid derivatives, and copolymers thereof, polymethacrylic acid and polymethacrylic acid derivatives, and copolymers thereof, polyethylene glycol and polyethylene glycol derivatives and copolymers thereof, polyacrylamide polymers and copolymers, polyvinyl alcohol, polyvinyl alcohol derivatives, and copolymers thereof, or combinations thereof.

Alternatively, the hydrogel may be derived from crosslinked polymer selected from a group comprising polysaccharides, chitin, polypeptides, alginates, celluloses or combinations thereof. Exemplary crosslinked polymers include, but are not limited to, xanthan gum, crosslinked guar gum, crosslinked starches, carboxymethyl cellulose.

Alternatively, the hydrogel may be derived from a reactive clay, such as bentonite.

The two-part gel stemming material as described herein may be prepared by mixing a first precursor fluid, such as water, with a second precursor fluid containing the gel precursor which react together to form the hydrogel. The second precursor fluid may be a non-aqueous solution of the gel precursor, an emulsion (e.g. oil-in-water) of the gel precursor, or a suspension of the gel precursor dispersed in a carrier fluid.

Hydrogels, in particular SAPs, have the ability to form a gel with water or aqueous solutions having a broad range of Total Dissolved Solids (TDS) content, ranging from 0 mg/l to 100,000 mg/l. Accordingly, the first precursor fluid may be water, deionised water, ultrapure, water, distilled water, municipal water, ground water, produced water, process water, waste water, brackish water, saline water or a mixture of two or more of the foregoing fluids.

In one particular embodiment, the first precursor fluid may be brackish water having a total dissolved solids between 100 mg/L to 5000 mg/L. In another particular embodiment, the first precursor fluid may be saline water having a total dissolved solids greater than 5000 mg/L. It will be apparent to those skilled in the art that waste water (e.g. desalination concentrate streams, spent process streams) which would usually be discharged into the environment (and optionally treated beforehand) may be used as the first precursor fluid.

One embodiment of a delivery system 10 configured to mix and dispense a two-part gel stemming material into a blast hole will now be described with reference to the Figures by way of example only.

Figure 2:
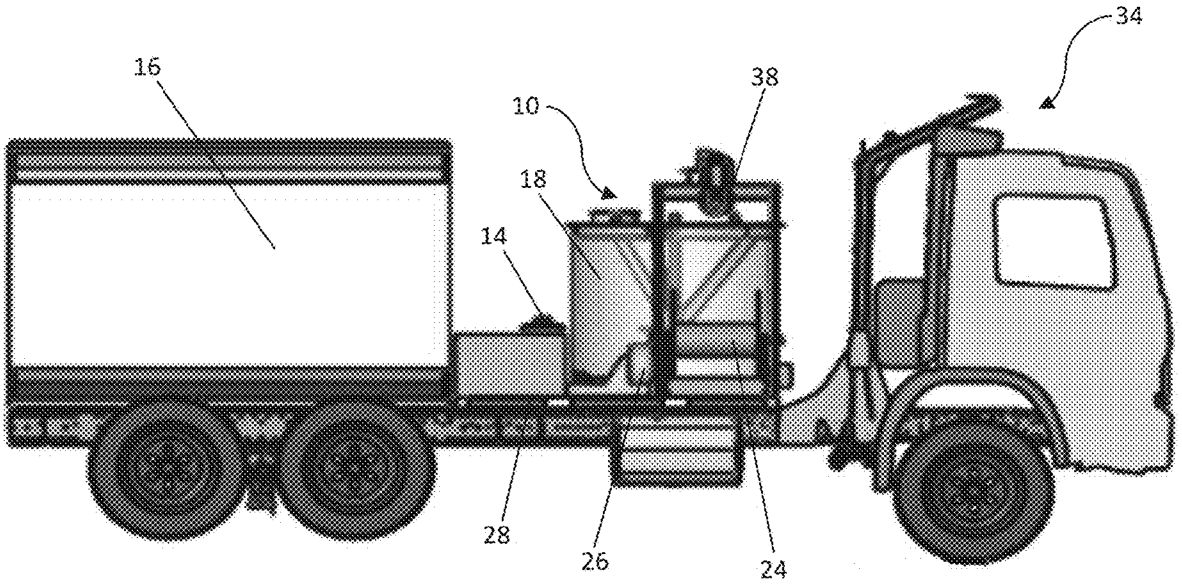
FIG. 2 is a side view of one embodiment of the delivery system mounted to a vehicle.
Figure 3:
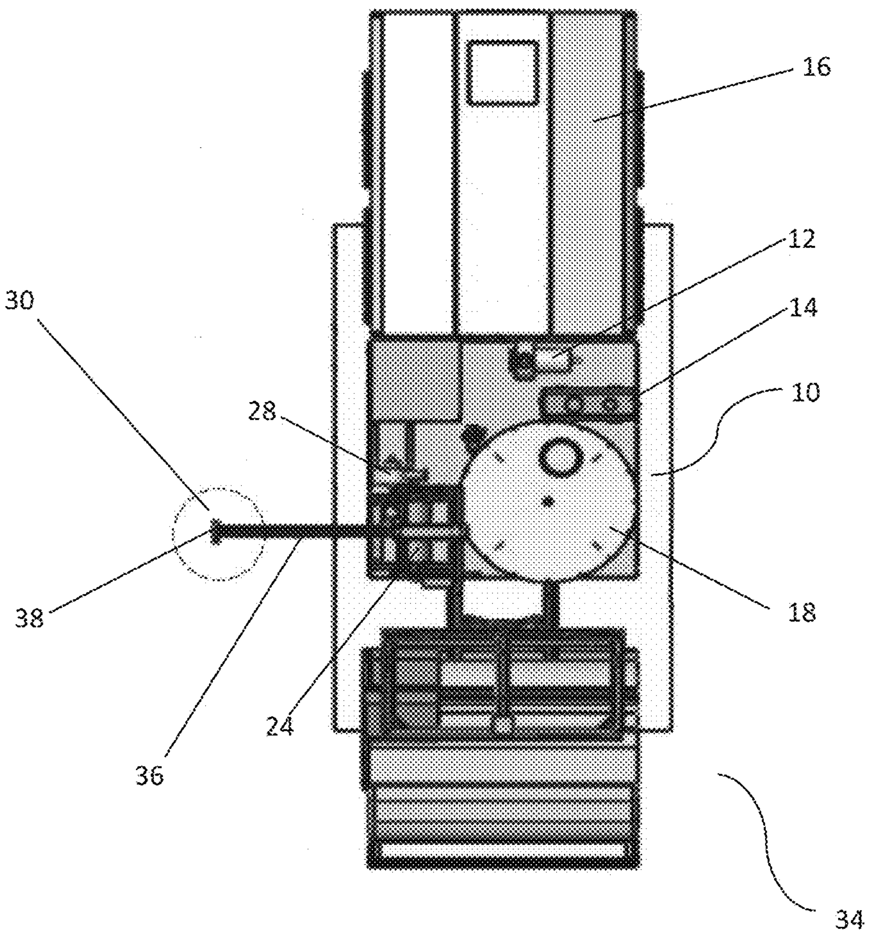
FIG. 3 is a plan view of the vehicle shown in FIG. 2 deployed adjacent to a blast hole.

Referring to FIGS. 1 to 3, the delivery system 10 includes a dual-pump assembly comprising a first pump 12 and a second pump 14. The first pump 12 is in fluid communication with a water storage tank 16 and the second pump 14 is in fluid communication with a storage tank 18 containing the second precursor fluid, as described above. It will be appreciated that in certain embodiments, wherein the second precursor fluid is an emulsion or a suspension of the hydrogel precursor, the storage tank 18 may be provided with an agitator 20, such as an impellor, to maintain the stability of the emulsion or prevent the hydrogel precursor particles from settling in the storage tank 18.

The first and second pumps 12, 14 may be any suitable pump capable of pumping the first and second precursor fluids. Suitable examples of pumps may include, but are not limited to, peristaltic pumps, centrifugal pumps, and diaphragm pumps. A person skilled in the art would appreciate that the size and power of the first and second pumps 12, 14 will be selected on the basis of the volume and flow rate requirements for pumping the first and second precursor fluids.

The system 10 also includes a pair of hoses (not shown) in fluid communication with respective inlets of the first and second pumps 12, 14 and a dosing head 22 (as shown in FIGS. 4, 5, 6A and 6B) arranged in fluid communication via said hoses with the dual pump assembly. One particular embodiment of the dosing head 22 will be described in more detail below. Generally, the dosing head 22 is configured to receive and mix the first and second gel precursor fluids to produce the gel stemming material and to dispense the gel stemming material in the blast hole.

The pair of hoses are associated with a means to vary the effective length of the hoses, such as a hose reel 24. The hose reel 24 may be driven by a motor 26 which may be remotely controlled by an operator or an automated controller. In this way, in use, the effective length of the hoses may be varied to position the dosing head 22 at any desired depth in the blast hole. The hoses are generally flexible hoses of any suitable length (e.g. 30-50 m) and diameter (e.g. 1-2"). In use, the pair of hoses may be coupled closely together by ties or clips at suitable intervals along their length to prevent trip hazards, tangling and to make it easier for the hose reel 24 to pay the pair of hoses out or in when the dosing head 22 is being positioned downhole in the blast hole or withdrawn/retrieved from the blast hole.

It will be appreciated that the first and second precursor fluids react rapidly (1-10 sec) to produce the hydrogel when they are mixed in the desired ratios. Advantageously, the pair of hoses are arranged, in use, to keep the first and second precursor fluids separate until they are ready to be mixed and the hydrogel is placed downhole. In this way, it is possible to deliver the two-part stemming material directly into the blasthole instead of pumping it into the blasthole from the surface.

The dual-pump assembly may be provided with a control system associated with the first and second pumps 12, 14 to vary any one or more of pressure, volume, flow rate of the first and/or second gel precursor fluids flowing through the hoses to the dosing head 22. The control system may be provided with one or more in-line flow meters (not shown) to monitor one or more of pressure, volume, flow rate of the first and/or second gel precursor fluids in the hoses. The flow rate and volume of gel stemming material delivered downhole will be calibrated for reporting and the ratio and flow rate of first and second precursor fluids delivered to the dosing head 22 will vary for different diameter blast holes and for varying water quality. For example, as the hardness of water (i.e. the first precursor fluid) increases, more second precursor fluid is required to produce the desired gel stemming material.

The delivery system 10 may be mounted onto a platform 28 or a frame to enable the delivery system 10 to be readily transported to one or more locations on a worksite, in particular proximal to a blast hole 30, as shown in FIG. 3. The platform 28 or frame may be configured with a plurality of lifting lugs and/or lifting slots 32 to receive forklift tines and thereby enable effective transportation of the delivery system 10 by a crane, hoist or forklift. In this way, the delivery system 10 may be transported and used in a number of different configurations including trailer-mounted, track-mounted for all terrain use, skid-mounted for off road use, and so forth.

In the embodiment shown in FIGS. 2 and 3, the frame 28 mounted delivery system 10 is mounted on a cab chassis of a vehicle 34, such as a truck. Conveniently, the vehicle 34 may be a truck already provided with the water storage tank 16. Such vehicles are commonly used on site to spray water for the purposes of dust suppression. The provision of a dual purpose vehicle as described herein would save operational and capital expenditure.

In the embodiment shown in FIGS. 2 and 3, the delivery system 10 may further comprise an arm 36 slidable between a stowed position and an extended position. It will be appreciated by those skilled in the art that the arm 36 may be hydraulically driven and mounted on a track with one or more roller assemblies (not shown) or similar means to facilitate movement of the arm 36 between the stowed and extended positions. The arm 36 is provided with a collar 38 at a distal end thereof adapted to support the hoses and the dosing head 22 to facilitate more convenient positioning of the dosing head 22 downhole in the blast hole 30.

Additionally, the arm 36 may be rotationally mounted to allow the arm 36 to horizontally slew when in the extended position, thereby allowing for improved positioning of the collar 38 and the dosing head 22 with respect to the blast hole 30.

In use, vehicle 32 may travel (e.g. down a row of blast holes) with the arm 36 in the stowed position. It will be appreciated that the vehicle may be driver-operated, a partially autonomous vehicle or a fully autonomous vehicle. When the vehicle stops proximal to a specific blast hole 30 to stem the blast hole 30 with gel stemming material, the arm 36 may be hydraulically driven to the extended position so that the collar 38 supporting the dosing head 22 is generally in vertical alignment with the blast hole 30. The hose reel 20 may be operated to vary the effective length of the hoses of the delivery system 10 to lower the dosing head 22 to the desired depth in the blast hole 30. This may be conveniently achieved without manual placement by an operator. For a driver-operated vehicle, the operator may optionally remain in the cab of the vehicle 32 without needing to come in close proximity to a loaded blast hole 30.

The dual pump assembly of the delivery system 10 may then be operated to draw the first and second gel precursor fluids from their respective sources and cause said fluids to flow through respective hoses to the dosing head 22. The fluids are received and mixed in the dosing head 22 to produce the gel stemming material and the gel stemming material is dispensed via one or more outlets in the dosing head 22 into the blast hole 30.

Simultaneous with, or subsequent to, dispensing the gel stemming material in the blast hole 30, the hose reel 20 may be operated to shorten the effective length of the hoses to progressively withdraw the dosing head 22 from the blast hole 30 as the blast hole 30 is stemmed with the gel stemming material.

FIGS. 4, 5, 6A and 6B show the dosing head 22 of the delivery system 10 in more detail. The dosing head 22 includes a first inlet 40 and a second inlet 42. The first inlet 40 is arranged in fluid communication via one of the pair of hoses with the first pump 12 to receive the first gel precursor fluid and the second inlet 42 is arranged in fluid communication via the other of the pair of hoses with the second pump 14 to receive the second gel precursor fluid.

The dosing head 22 also includes a first chamber 44 comprising a central passage 46 and a concentrically aligned annular passage 48 in fluid communication with the first and second inlets 40, 42, respectively, via conduits 50, 52. The first and second inlets 40, 42 may be integrally formed with a collar 54 which is provided with an internal thread to engage a complementary thread 56 on an external surface 58 of an upper portion 60 of the first chamber 44.

The dosing head 22 further includes a second chamber 62 which is configured to receive and mix the first and second gel precursor fluids to produce the gel stemming material. The second chamber 62 is adjacent to the first chamber 44 and in fluid communication with the central and annular passages 46, 48.

For example, in the embodiment shown in FIGS. 4, 5 6A and 6B, a lower end 64 of the central passage 46 extends into the second chamber 62. The lower end 64 may be provided with a plurality of radially spaced apertures 66 through which the first gel precursor fluid flows into the second chamber 62. A lower wall 68 of first chamber 44 is provided with a partial annular aperture 70 through which the second gel precursor fluid flows into the second chamber 62. The radially spaced apertures 66 are arranged to increase the flow rate of the first gel precursor fluid into the second chamber 62 and encourage turbulent mixing of the first gel precursor fluid with the second gel precursor fluid.

It will be appreciated that the lower end 64 of the central passage 46 may be provided with alternative arrangements for introducing the first gel precursor fluid into the second gel precursor fluid, such as a diffusing head, and thereby encourage efficient mixing of said fluids.

Figure 4:
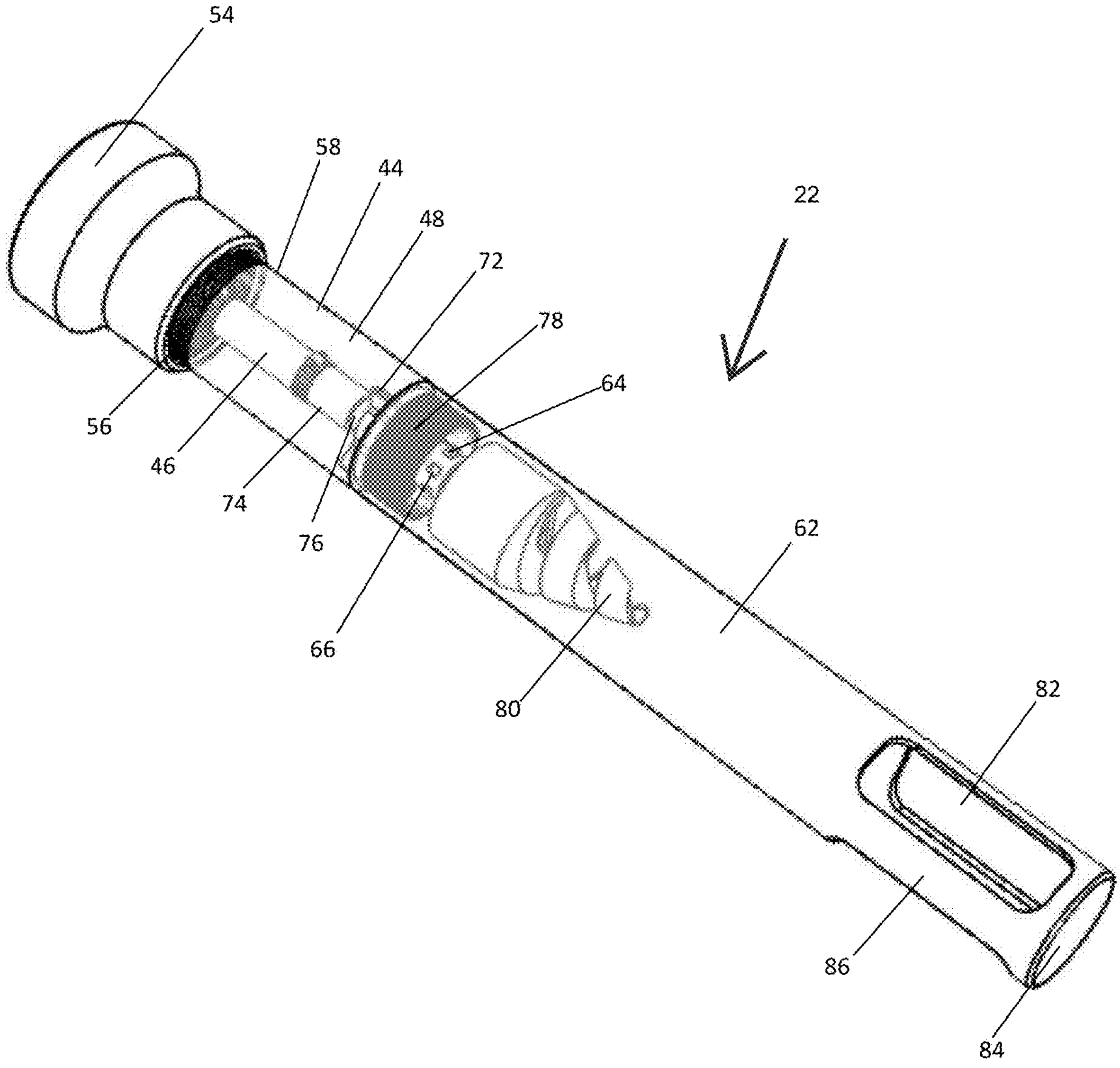
FIG. 4 is a perspective view of one embodiment of a dosing head as disclosed herein.
Figure 5:
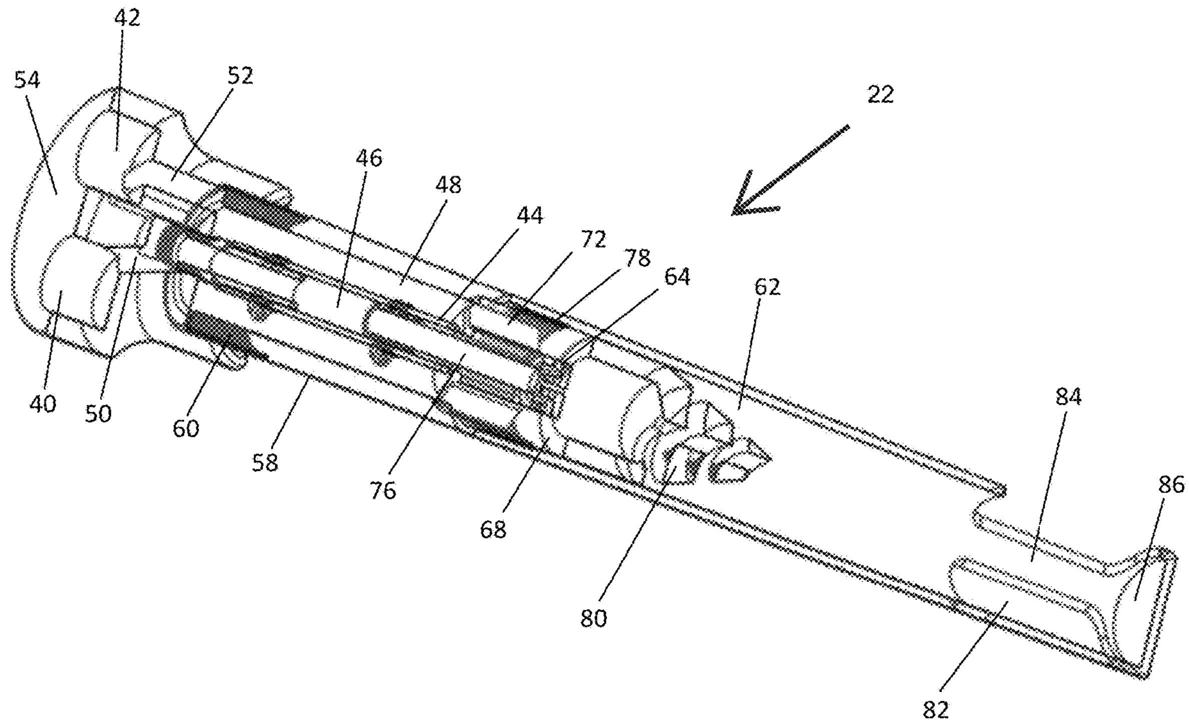
FIG. 5 is a longitudinal cross-sectional view of the dosing head shown in FIG. 4.
Figure 6A:
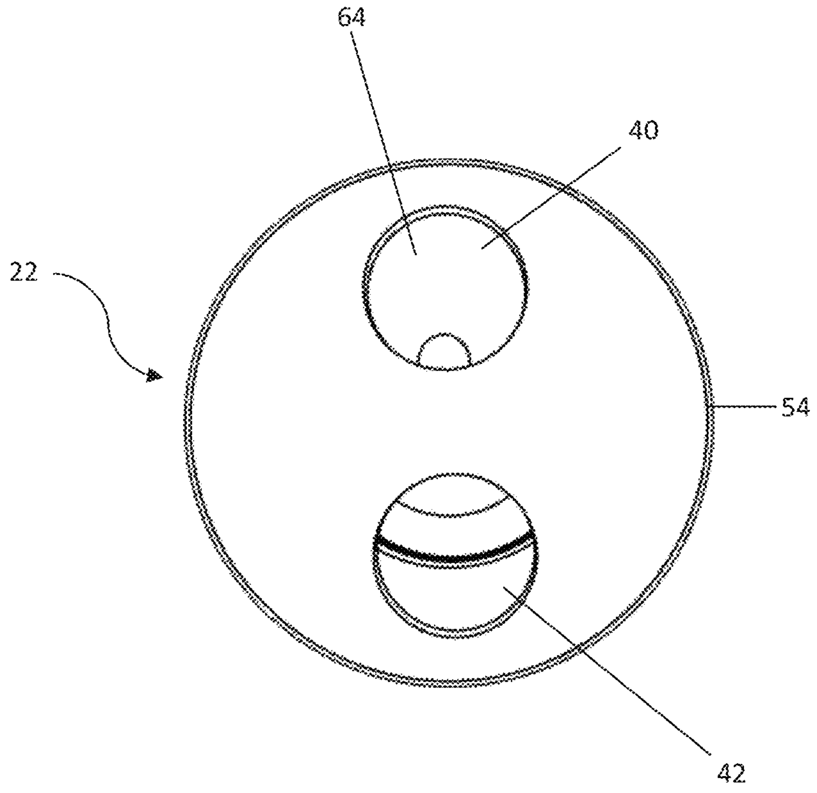
FIG. 6A is a top plan view of a connector of the dosing head shown in FIGS. 4 and 5.
Figure 6B:
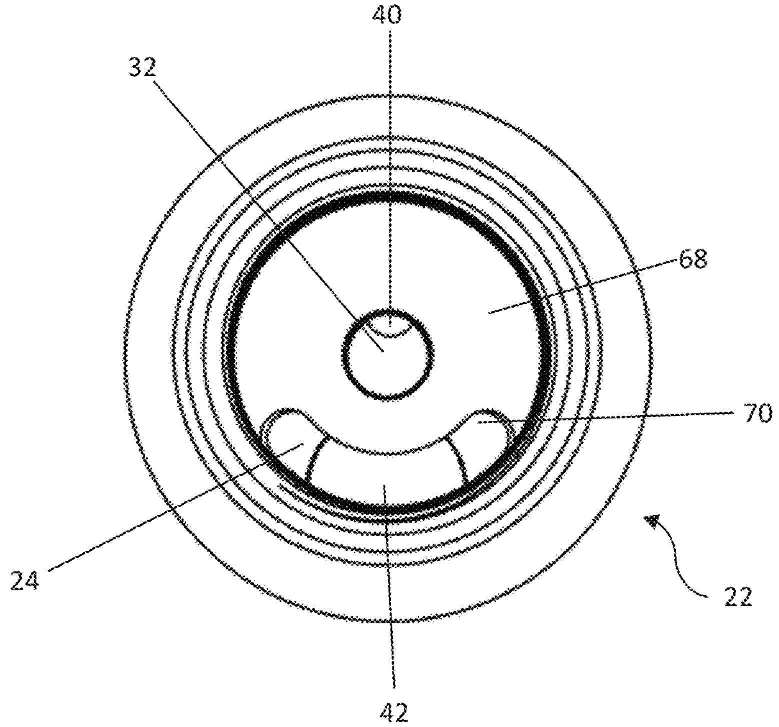
FIG. 6B is an opposing plan view of the connector shown in FIG. 6A.

Additionally, the central passage 46 may have a plurality of protrusions 72 extending into the annular passage 48 from an external surface 74 of a lower portion 76 of the central passage 46 into the annular passage 48. The plurality of protrusions 72 may be integral to the external surface 74 of the central passage 46 or may be attached to the central passage 46 by a collar or an insert 78 as shown in FIGS. 4 and 5. The protrusions 72 act as baffles, producing turbulent flow in the second precursor fluid immediately before it enters the second chamber 62. The turbulent flow of the second gel precursor fluid imparts further energy to promote improved mixing between the first and second gel precursor fluids.

Referring to FIGS. 4 and 5, the second chamber also includes a static mixing element 80 comprising a helical element to encourage radial mixing of said gel precursor fluids. The person skilled in the art would appreciate that the static mixer element 80 may take alternative forms.

The second cylindrical chamber 62 includes a plurality of outlets 82 through which the gel stemming material is dispensed. The outlets 82 comprise large apertures in a cylindrical wall 84 of a lowermost portion 86 of the second chamber 62.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

For example, the vehicle 34 on which the delivery system 10 as described herein is mounted may be provided with a means for loading explosives into the blasthole, so that the blasthole may be loaded with explosives and subsequently stemmed with the two-part gel stemming material as described above.

Additionally or alternatively, the vehicle 34 on which the delivery system 10 as described herein is mounted may be provided with a means for loading aggregate stemming material into the blasthole. In some embodiments, aggregate stemming material could be loaded into the blasthole as an alternative stemming material to the two-part gel stemming material, thereby providing the operator with a choice of stemming materials to use. In other embodiments, aggregate stemming material could be loaded into the blasthole followed by the two-part gel stemming material to fill voids in the aggregate stem.

It will also be appreciated that water trucks which are commonly to spray water on site for dust suppression may be conveniently configured to include the delivery system 10 as described herein, wherein the existing water tank of the water truck could be deployed as the water storage tank 16, as required. In this way, the water truck could effectively be provided with the dual purpose of water suppression and two-part gel stemming material delivery system 10, optionally with aggregate stemming as described above.

The invention claimed is:

1. A delivery system for mixing and dispensing a gel stemming material into a blast hole, said system comprising:

a dual-pump assembly in fluid communication with respective sources of a first gel precursor fluid and a second gel precursor fluid;

a pair of hoses associated with a means to vary an effective length of said hoses;

a dosing head having a first inlet and a second inlet, said inlets arranged in respective fluid communication via said hoses with the dual pump assembly to receive the first and second gel precursor fluids, the dosing head being configured to receive and mix the first and second gel precursor fluids to produce the gel stemming material and to dispense the gel stemming material via an outlet;

an arm movable between a stowed position and an extended position, the arm having a collar at a distal end thereof adapted to support the hoses and the dosing head to facilitate positioning of the dosing head downhole; and, a platform or frame mountable on a vehicle to support the dual-pump assembly, the pair of hoses, the dosing head and said arm;

wherein the arm is rotationally mounted to allow the arm to horizontally slew when in the extended position to an orthogonal position with respect to a direction of travel of the vehicle, thereby allowing for the collar and the dosing head to be positioned in vertical alignment with the blast hole.

2. The delivery system according to claim 1, wherein the dosing head comprises a first chamber comprising a central passage and a concentrically aligned annular passage in fluid communication with the first and second inlets, and a second chamber in fluid communication with said central and annular passages, the second chamber being configured to receive and mix the first and second gel precursor fluids to produce the gel stemming material and to dispense the gel stemming material via the outlet.

3. The delivery system according to claim 1, wherein the second chamber further comprises a static mixing element.

4. The delivery system according to claim 1, wherein the dual-pump assembly comprises a control system to vary any one or more of pressure, volume, flow rate of the first and/or second gel precursor fluids flowing through the hoses.

5. The delivery system according to claim 4, wherein the control system is provided with one or more in-line flow meters.

6. The delivery system according to claim 1, wherein the means for varying the effective length of the pair of hoses comprises a hose reel.

7. The delivery system according to claim 1, wherein the delivery system further comprises at least one storage container for holding the first gel precursor fluid or the second gel precursor fluid.

8. The delivery system according to claim 7, wherein the at least one storage container is provided with an agitator.

9. The delivery system according to claim 1, wherein the platform or frame is configured with lifting lugs and/or lifting slots.

10. A method of stemming a blast hole, the method comprising:

positioning a delivery system as defined in claim 1 proximal to the blast hole;

lengthening an effective length of the hoses of the delivery system to deploy the dosing head of the delivery system downhole of the blast hole;

operating the dual pump assembly of the delivery system to draw the first and second gel precursor fluids from their respective sources and cause said fluids to flow through the hoses to the dosing head, whereupon said fluids are received and mixed in the dosing head to produce the gel stemming material; and dispensing the gel stemming material via the outlet in the dosing head.

11. The method according to claim 10, wherein concomitantly with, or subsequent to, dispensing the gel stemming material, the method further comprises shortening the effective length of the hoses to progressively withdraw the dosing head from the blast hole as the blast hole is stemmed with the gel stemming material.

* * * * *